T. C. SMITH.
MAUSOLEUM.
APPLICATION FILED DEC. 4, 1913.

1,163,625.

Patented Dec. 7, 1915.
5 SHEETS—SHEET 1.

Witnesses

Inventor
Tom C. Smith
By
Edward R. Inman
Attorney

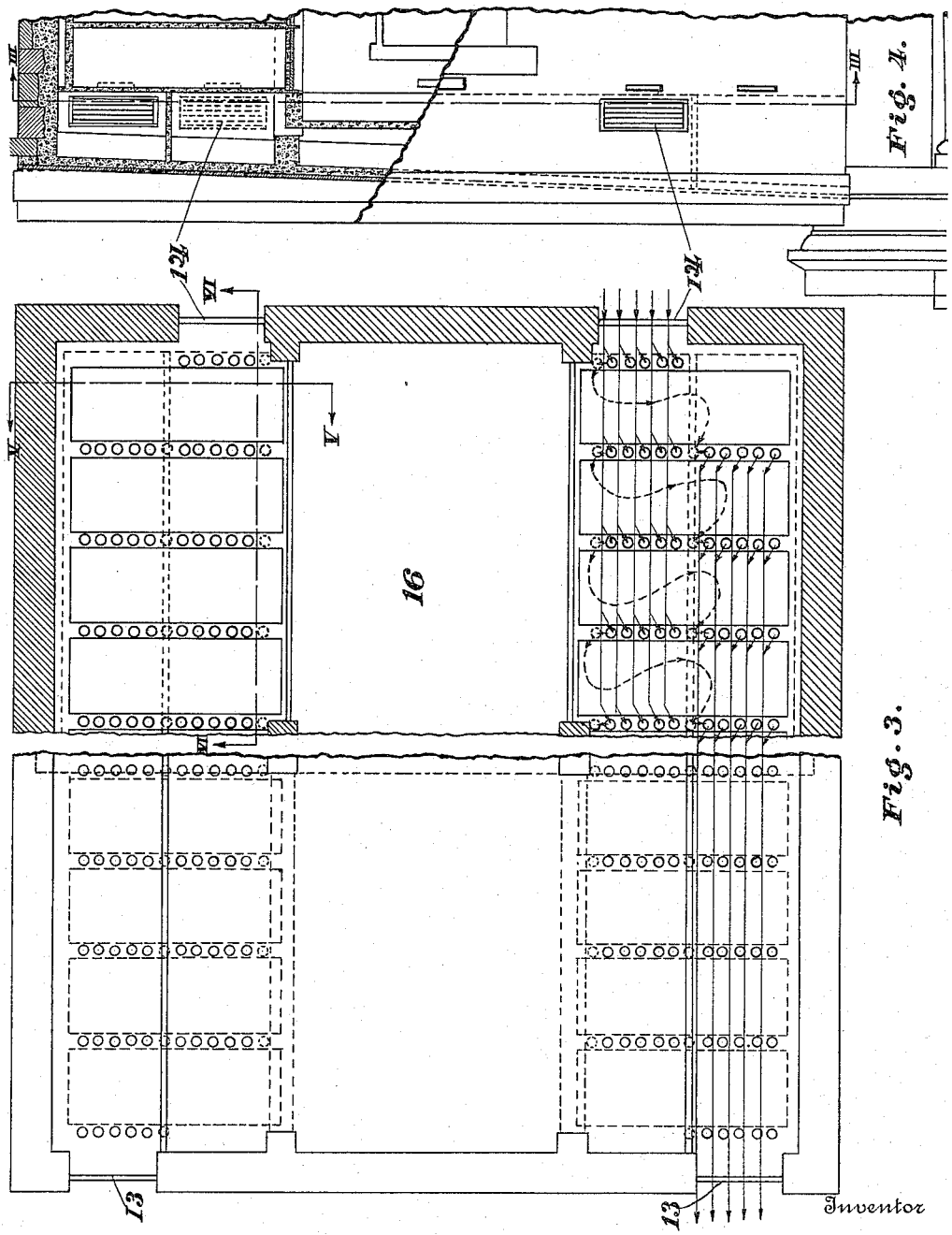

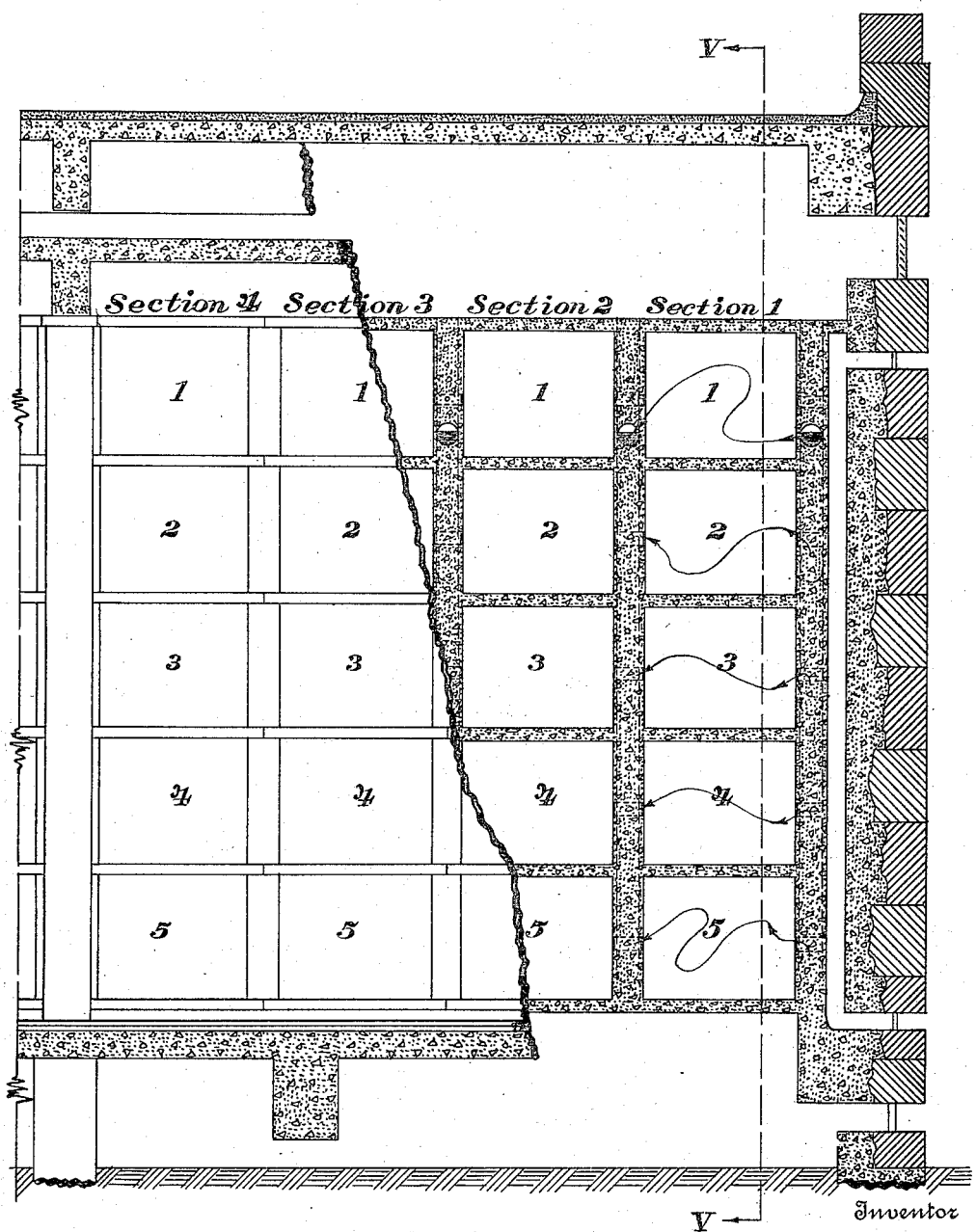

T. C. SMITH.
MAUSOLEUM.
APPLICATION FILED DEC. 4, 1913.

1,163,625.

Patented Dec. 7, 1915.
5 SHEETS—SHEET 5.

Witnesses

Inventor
Tom C. Smith
By Edward R. Inman
Attorney ced with a system of ventilation, dis-

UNITED STATES PATENT OFFICE.

TOM C. SMITH, OF FRANKLIN, PENNSYLVANIA, ASSIGNOR TO KEYSTONE MAUSOLEUM CO., OF FRANKLIN, PENNSYLVANIA, A CORPORATION OF DELAWARE.

MAUSOLEUM.

1,163,625.     Specification of Letters Patent.     Patented Dec. 7, 1915.

Application filed December 4, 1913. Serial No. 804,605.

*To all whom it may concern:*

Be it known that I, TOM C. SMITH, citizen of the United States, residing at Franklin, in the county of Venango and State of Pennsylvania, have invented certain new and useful Improvements in Mausoleums, of which the following is a specification.

The object of this invention is to provide a mausoleum, the structural nature of which shall be conducive to durability and ornateness, and the crypts within the same be equipped with a system of ventilation, disinfection and desiccation which shall render and maintain the same at all times in a state of wholesome purity and sanitation, and free from the possible presence of effluvious gases or offensive odors.

Figures 1, 2:
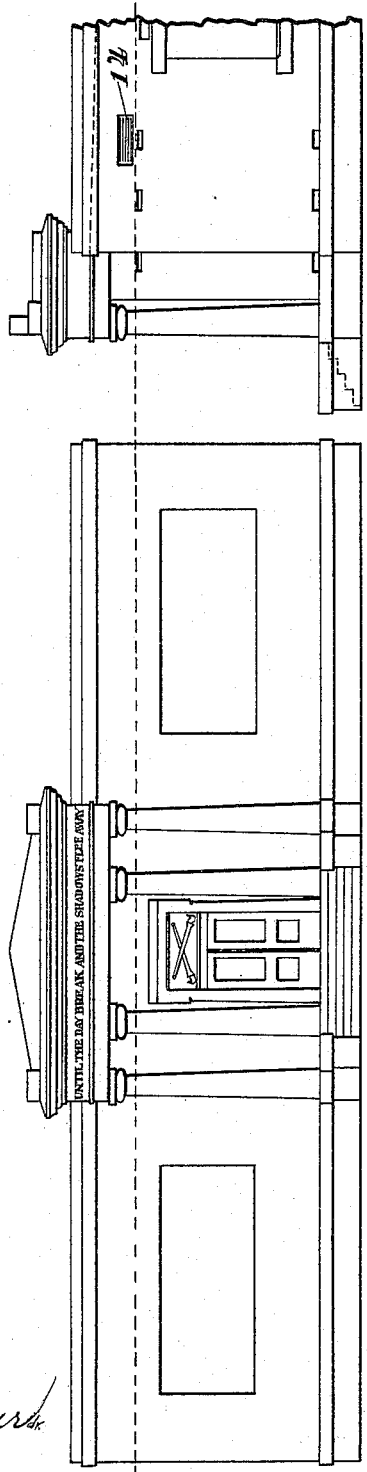
Figure 5:
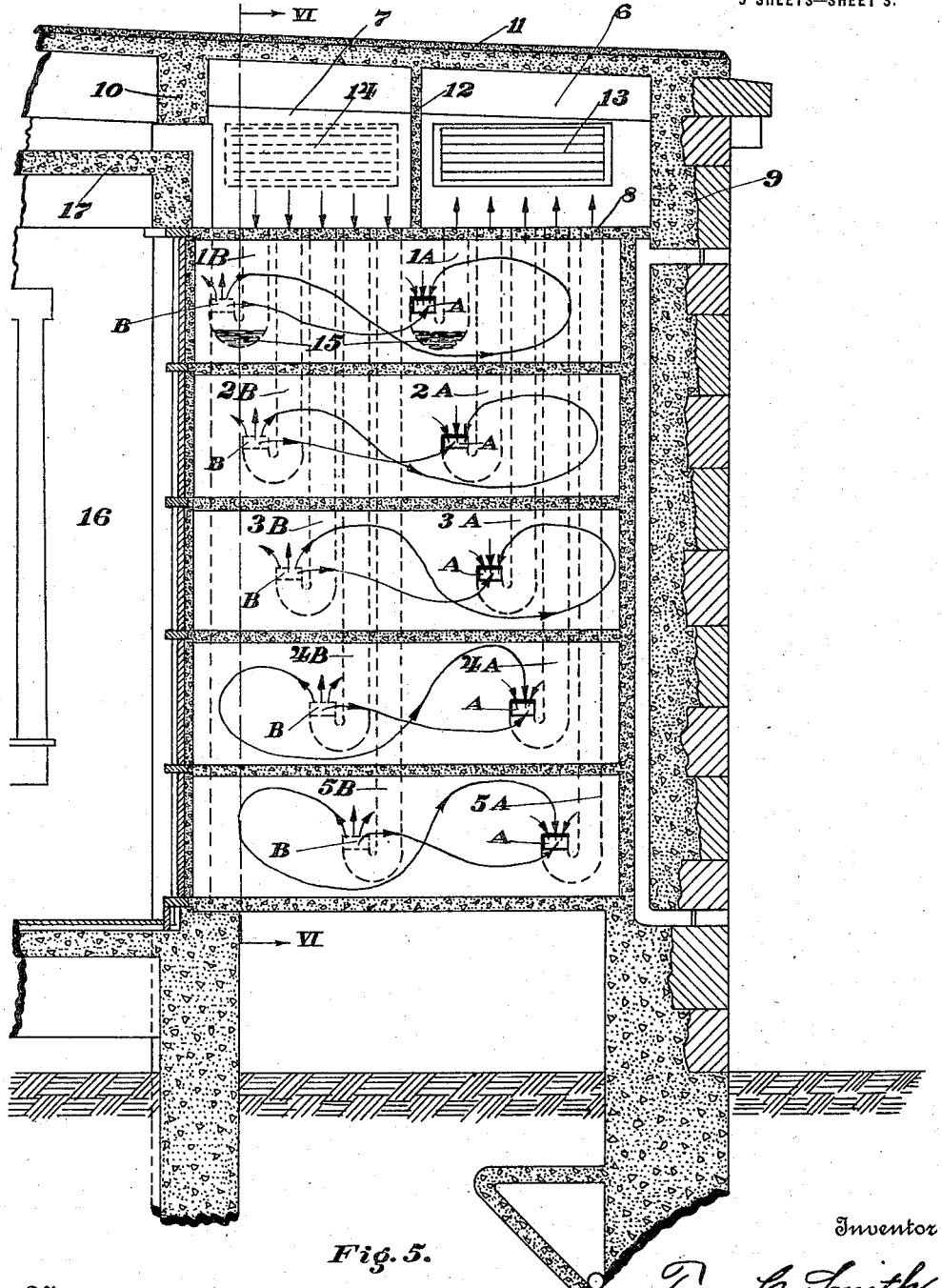
Figure 8:
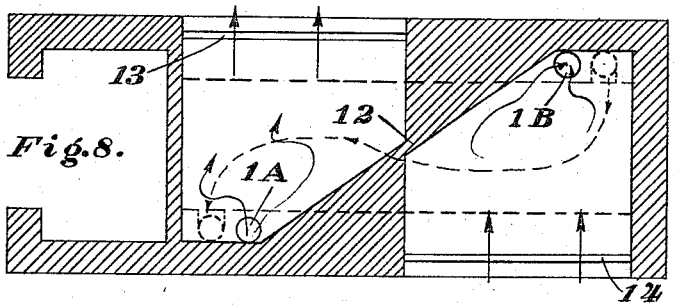
Figure 9:
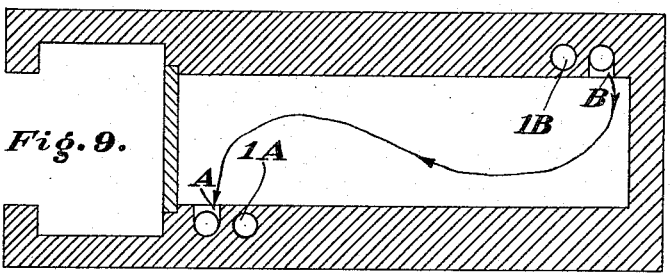
Figure 10:
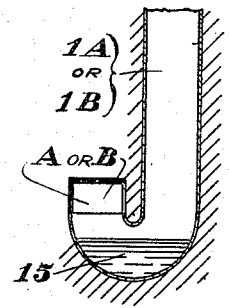
Figure 7:
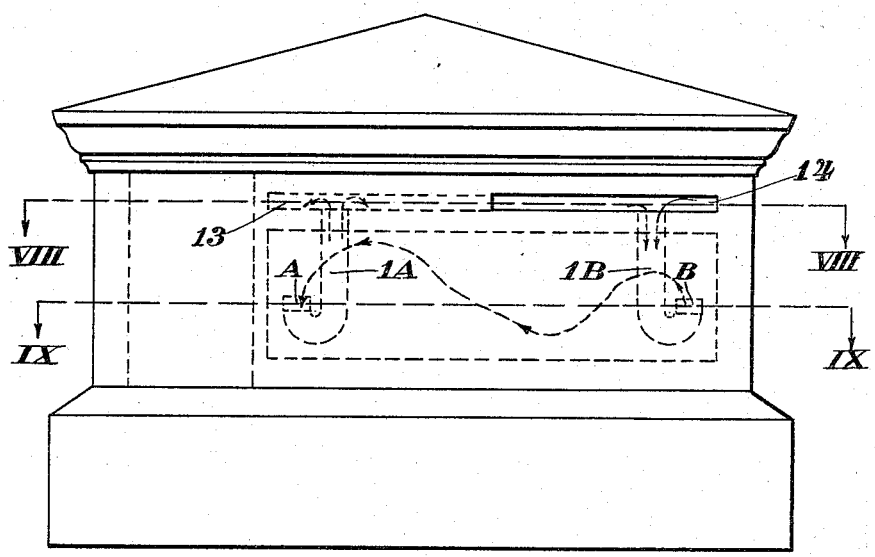

The construction whereby these objects are attained is clearly shown in the drawings which form a part hereof, the various figures of which are as follows:

Figure 1 is a front elevation of a mausoleum embodying my invention. Fig. 2 is a partial side elevation thereof. Fig. 3 is a section on line III—III of Fig. 4. Fig. 4 is an elevation of the upper portion of one end of the mausoleum, a portion of which is shown in section on line VI—VI of Fig. 3. Fig. 5 is a vertical, transverse section through that portion of the structure indicated by line V—V of Fig. 3. Fig. 6 is a vertical longitudinal section of the mausoleum structure at the point indicated by line VI—VI of Fig. 3. Fig. 7 is an elevation of the structure embodying my invention, and containing but a single crypt. Fig. 8 is a horizontal section upon line VIII—VIII of Fig. 7. Fig. 9 is a horizontal section upon line IX—IX of Fig. 7. Fig. 10 is a vertical section of one of the air ducts.

The same reference characters are applied to identical parts in all views.

Certain details of structure and arrangement could be considerably modified without departing from the scope of my invention.

Inasmuch as my invention does not involve features of construction of the foundation or the floor of the structure, these may conform to local conditions and requirements, provided however, that their construction shall be such as shall insure permanence and stability, also insure sanitary conditions, especially in respect to the exclusion of moisture from the interior of the building and be otherwise in harmony with and suited to the purpose for which the structure is intended.

The construction here shown, in so far as it relates to the embodiment of our invention is as follows: As will be readily understood by an inspection of the drawings, the interior of the structure comprises one or more crypts, and where more than one crypt is provided for, they are arranged in series or sections, being vertically positioned with relation to each other. By a reference to Fig. 6 it will be noted that the individual crypts in each section are designated by the numbers 1, 2, 3, 4, 5, and the sections are designated "section 1," "section 2," "section 3," and "section 4." With respect to the number of crypts in a section, or the number of sections in the structure, this is a matter which may be arranged as circumstances require, inasmuch as my invention may be as readily and completely embodied in a structure containing but one crypt as shown in Figs. 7, 8 and 9 as it can in a structure comprising many crypts, as shown in the other figures of the drawings. Within the vertical partitions which form the sides of the crypts, air passages are formed,—two for each crypt, one passage being positioned upon either side of the crypt, and having communication with the interior thereof, preferably at opposite, or the most remote points possible, thus insuring a complete ventilation of the whole interior of the crypt. This feature is clearly illustrated in Fig. 5, which is a central, vertical, longitudinal section through a section of crypts. Said air passages upon the farther side of the crypt are designated, $1^A$, $2^A$, $3^A$, $4^A$, and $5^A$, each of which is provided with an opening A into its respective crypt. The passages upon the near side of the crypt, (which should be understood as being the side which is removed in this section) are designated $1^B$, $2^B$, $3^B$, $4^B$, and $5^B$, each of which is provided with an opening B into its respective crypt.

It will be readily understood that the passages $1^A$ and $1^B$ communicate by means of said openings A and B respectively with crypt 1, passages $2^A$ and $2^B$ communicate with crypt 2, passages $3^A$ and $3^B$ communicate with crypt 3, passages $4^A$ and $4^B$ communicate with crypt 4 and passages $5^A$ and $5^B$ communicate with crypt 5. All of said passages extend vertically upward and open into the spaces 6 and 7 respectively, which are provided above the crypts. All of the passages A upon one side of the crypts open into the space 6, and all of the passages B upon the opposite side of the crypts open into the space 7. Said spaces 6 and 7 are preferably formed by the ceiling 8 of the uppermost crypt, the walls 9 and 10 of the inclosing structure and the roof 11 of said structure. A partition 12, which extends transversely of the crypts, and positioned centrally above the same, forms the partition between said spaces 6 and 7. Space 6 is provided with an opening 13 to the atmosphere, at one end only thereof, and space 7 is provided with a like opening 14 to the atmosphere at one end only and at the end opposite to that at which the opening 13 of the other space 6 is located. It will be noted that the spaces or chambers 6 and 7 extend transversely of said crypts, and that the partition 12, which separates said chambers or spaces, is located about centrally of said crypts, with respect to their longitudinal dimension. By this arrangement and positioning of said openings 13 and 14, any meteorological condition which disturbs the equilibrium of the atmosphere upon the respective sides of the structure at which said openings are located will cause a current of air to pass through said passages A and B and through said crypts. Under certain states, disturbances or conditions of the air the direction of movement of said current may be one way, and under different states, disturbances or conditions, may be in the opposite direction, but this is immaterial; so long as a movement of the air is caused to take place through said passages and crypts in either direction it will produce the desired ventilating and desiccating effect.

It is desirable that all bodies reposited within the crypts of a mausoleum should undergo desiccation rather than decomposition, and in order to insure such result in this structure, means are provided whereby the air upon both its entrance to and exit from the crypts, may be thoroughly impregnated with a suitable preservative and disinfecting agent. As illustrated in the drawings, said provision is as follows: Each of said vertically-disposed air-passages $A^1$, $B^1$ etc., is formed at its lower end into an upwardly-turned Y-bend, shown especially in Fig. 10, and into this through the upper end of said passages, which opens to the atmosphere, may be poured a measured quantity of disinfectant, so that it will occupy about as much space in the lower portion of said bend as is indicated at 15, in said Fig. 10, then, as a current of air passes through said passages it is caused to impinge upon the surface of said disinfectant whereupon it becomes impregnated therewith, and thus the particular object for which this feature is provided is effectively secured.

By a reference to Fig. 5 it will be seen that the structure as here shown, comprises a corridor 16 with sections of crypts upon either side thereof, and said ventilating space 7 is shown as extending over the ceiling 17 of said corridor and communicating with the corresponding space 7 upon the other side of said corridor. The structure may, or may not be so built, but in case it is so built, the openings to the atmosphere will both be upon the same end of said chambers as shown in said Fig. 3, as indicated by the reference numeral 14. I will state, however, that the matter of providing crypts upon both sides of said corridor, is wholly optional, that, as shown in the drawings, the construction upon one side of said corridor 16 is substantially identical with the construction upon the other side; that my inventive idea is completely embodied in the construction upon either side of said corridor, and that a typical form of said construction is illustrated by Fig. 5.

Figs. 7, 8 and 9 show a structure containing but a single crypt, to illustrate the way in which my inventive idea may be embodied by such a structure.

Claims.

1. In a mausoleum, in combination, a suitable structure having one or more receiving crypts therein, there being two chambers in said structure extending transversely of said crypts and having respectively communication with the atmosphere at opposite sides of the structure, an air passage leading from the interior of each of said crypts into one of said chambers, and an additional air passage leading from the interior of each of said crypts into the other chamber whereby any disturbance in the equilibrium of the atmosphere upon said sides of said structure will cause a current of air to pass through said crypts.

2. In a mausoleum, in combination, a suitable structure having one or more receiving crypts therein, there being two chambers in said structure extending transversely of said crypts and having respectively communication with the atmosphere at opposite sides of said structure at a point above the crypts, an air passage leading from the interior of each of said crypts into one of said chambers, and an additional air passage leading from the interior of each of said crypts into the other chamber whereby any disturbance in the equilibrium of the atmosphere upon said sides of said structure will cause a current of air to pass through said crypts.

3. In a mausoleum, in combination, a suitable structure having one or more receiving crypts therein, there being also two chambers in said structure extending transversely of said crypts and having respectively an opening to the atmosphere positioned at different sides of the structure, an air-passage leading from the interior of each of said crypts into one of said chambers, an air-passage leading from the interior of each of said crypts into the other chamber, whereby a disturbance in the equilibrium of the atmosphere upon said sides of said structure will cause a current of air to pass through said crypts, and means within said passages whereby said air is caused to be impregnated with a disinfectant during such passage.

4. In a mausoleum, in combination, a suitable structure having sections of vertically-positioned receiving crypts therein, there being two chambers in said structure positioned above said sections and extending transversely thereof and provided respectively with an opening to the atmosphere at opposite sides of the building or structure, an air-passage from the interior of each of said crypts into one of said chambers, an additional air passage leading from the interior of each of said crypts into the other chamber, whereby a disturbance in the equilibrium of the atmosphere between said sides of the structure will cause a current of air to pass through said chambers, passages and crypts.

5. In a mausoleum, in combination, a suitable structure having sections of vertically-related receiving crypts therein, there being two chambers in said structure positioned above said sections, extending transversely thereof and provided respectively with an opening to the atmosphere at opposite sides of the structure, an air passage leading from the interior of each of said crypts into one of said chambers, an additional air passage leading from the interior of each of said crypts into the other chamber, whereby any disturbance in the equilibrium of the atmosphere upon said sides of said structure will cause a current of air to pass through said chambers, passages and crypts, and means whereby the air so passing is caused to be impregnated with a desiccating and disinfecting agent.

In testimony whereof I affix my signature in presence of two witnesses.

TOM C. SMITH.

Witnesses:
M. E. Ross,
John L. McBride.